(12) United States Patent
Ayela et al.

(10) Patent No.: US 7,630,447 B2
(45) Date of Patent: Dec. 8, 2009

(54) SYSTEM OF COMMUNICATION BETWEEN SYNCHRONIZED SUBMARINE DEVICES

(75) Inventors: Gérard Ayela, Ploumoguer (FR); Christophe L'her, Brest (FR)

(73) Assignee: Sercel, Carquefou (FR)

(*) Notice: Subject to any disclaimer, the term of this patent is extended or adjusted under 35 U.S.C. 154(b) by 697 days.

(21) Appl. No.: 11/262,957

(22) Filed: Nov. 1, 2005

(65) Prior Publication Data
US 2007/0017430 A1 Jan. 25, 2007

(30) Foreign Application Priority Data
Jul. 20, 2005 (FR) .................................. 05 07701

(51) Int. Cl.
*H04L 27/00* (2006.01)
(52) U.S. Cl. .................. 375/259; 375/135; 375/136; 375/142; 375/143; 375/146; 375/147; 375/149; 375/220; 375/246; 375/253
(58) Field of Classification Search ................. 375/259, 375/135–136, 142–143, 146–147, 149, 220, 375/246, 253
See application file for complete search history.

(56) References Cited

U.S. PATENT DOCUMENTS

| 4,933,916 | A | | 6/1990 | May et al. |
| 5,784,339 | A | * | 7/1998 | Woodsum et al. ............ 367/134 |
| 5,835,530 | A | * | 11/1998 | Hawkes ....................... 375/225 |
| 5,896,304 | A | * | 4/1999 | Tiemann et al. ................. 708/5 |
| 6,094,987 | A | * | 8/2000 | Suzuki et al. .................... 73/597 |
| 2004/0091031 | A1 | * | 5/2004 | Dodgson et al. ............. 375/222 |
| 2005/0058081 | A1 | * | 3/2005 | Elliott ......................... 370/252 |
| 2005/0180263 | A1 | * | 8/2005 | Lambert et al. .............. 367/128 |

FOREIGN PATENT DOCUMENTS

WO WO 96/03689 A1 2/1996

* cited by examiner

*Primary Examiner*—Shuwang Liu
*Assistant Examiner*—Kabir A Timory
(74) *Attorney, Agent, or Firm*—Law Office of Tim Cook P.C.

(57) ABSTRACT

The invention relates to a system and a method of digital communication between synchronized submarine devices, system including means of sending a signal in modulated bit form, at least one sender (100) and at least one receiver (200), characterized in that said at least one sender (100) sends a signal enabling both any data to be transmitted to said at least one receiver (200) and a propagation time between said at least one sender (100) and said at least one receiver (200) to be measured.

18 Claims, 2 Drawing Sheets

SYSTEM OF COMMUNICATION BETWEEN SYNCHRONIZED SUBMARINE DEVICES

The invention relates to a system and a method combining data transmission and distance measurement between synchronized devices.

BACKGROUND OF THE INVENTION

The invention relates in particular to a system and a method combining a transmission of signals conveying any information and a measurement of distance between devices, in which the signals transmitted between the devices are digital signals, modulated, in particular by spread spectrum, and in which the measurement of distance is performed by estimating the propagation time of these signals between the devices.

The invention applies in particular to the transmission of data and measurement of distance between submarine devices communicating by acoustic waves.

Those skilled in the art are familiar with systems enabling distance to be measured between synchronized devices.

Among these, and generally, the measurement of distance between devices, including at least one sender and at least one receiver, is performed on the basis of the estimation of the propagation time of a monochromatic pulse or of a spread-spectrum modulated pulse sent by a sender, then received and time-stamped by a receiver.

The systems using a monochromatic pulse are well known to those skilled in the art and therefore will not be described below.

Document WO 96/03689 discloses a system in which the transmitted information is modulated by spread spectrum. The spread-spectrum modulation presents numerous advantages over a more conventional modulation because the signals modulated in this way provide for, among other things a far lower susceptibility to scrambling by signal interference, the sending of multiple signals over a frequency band and even the elimination or processing of multiple paths, multiple paths being better known by the name of fading.

In this document, the sole objective of the transmitted signals is to enable distance to be measured between devices. The means implemented are therefore provided to this end.

Furthermore, the spread-spectrum modulation in this case is more particularly performed according to a pseudo-random method. In this type of modulation, the signal sent is expressed in the form:

$$a(t)=\Psi(t)*d(t) \text{ in which } \Psi(t)=\Phi(t \bmod t_s),$$

t being the time, d(t) being a function taking positive and negative unit values, $\Phi(t)$ being a pulse sequence, including one or more bits, sent pseudo-randomly and of length $t_s$, and $\Psi(t)$ being a train of sequences $\Phi(t)$ repeated N times.

The estimation of the propagation time between two devices is performed on a correlator located in a receiver by time-stamping the passage of the pulse sequences by means of the peaks of the self-correlation function linked to these sequences. Then, the correlator performs a time-oriented integration of the product of the signal received and the various pulse sequences and deduces from this the time of arrival of the signal.

In this document, and, moreover, in numerous documents of the state of the art, a first pulse sequence is sent by a sender to a receiver which determines the propagation time, then this receiver of the first sequence becomes sender of a second sequence of pulses to the sender of the first sequence of pulses which then computes the propagation time of the second sequence of pulses. Knowing the propagation times of these two sequences, the distance between devices is then deduced, with increased accuracy. This method, well known to those skilled in the art, is particularly useful when the signal is of an electromagnetic type, given the high velocity of the signal involving short propagation times.

There are numerous applications for which the objective is not to measure a distance between devices but to convey any information, with specific means and according to a specific method.

In the case of communication between submarine devices, it is particularly interesting to be able to interchange any information such as, for example, information concerning the temperature, the pressure, the address of the sender or other information, and to establish the distance between devices based on the signal conveying the information.

Furthermore, in the case of submarine devices, the signals are transmitted by acoustic waves and the propagation times of these waves are very much longer than the times involved for electromagnetic waves. In this case, there is no point in performing one or more round trip measurements of a propagation time, but in this case it is essential to estimate as accurately as possible the propagation time of the signal between a sender and a receiver in order to deduce from this the distance separating them.

BRIEF SUMMARY OF THE INVENTION

These objectives are achieved in the context of the present invention through a system of digital communication between synchronized submarine devices, including means of sending a signal in modulated bit form, at least one sender and at least one receiver, characterized in that said at least one sender sends a signal enabling both any data to be transmitted to said at least one receiver and a propagation time between said at least one sender and said at least one receiver to be measured.

These objectives are also achieved in the context of the present invention through a method of digital communication between synchronized submarine devices, based on the sending of a signal in modulated bit form and including a step consisting in:

sending a signal enabling both any data to be transmitted and a propagation time between at least one sender and at least one receiver to be measured.

BRIEF DESCRIPTION OF THE DRAWINGS

Other characteristics, objects and advantages of the present invention will become apparent from reading the detailed description that follows, and in which:

FIG. 3b represents a binary sequence modulated according to an embodiment and in accordance with the modulation represented in FIG. 3a;

FIG. 6 represents a binary sequence modulated according to an embodiment variant and according to the modulation represented in FIG. 3a.

DETAILED DESCRIPTION OF THE INVENTION

FIG. 1 is a transmission diagram of a signal between a sender 100 and a receiver 200, the sender 100 including means for sending a signal $S_N$ received by a receiver 200. This signal $S_N$, of acoustic type, conveys information of any type such as, by way of non-limiting example, the address of the device intended to time-stamp, temperature or pressure data, and this in digital form. The digital signal is output and transmitted in digital form through a means suitable for generating acoustic pulses, that is, a transducer (not shown). The pulses supplied by the transducer are of two types to be able to represent "0" or "1" bits. A succession of acoustic pulses is called a binary sequence. The signal $S_N$ is, furthermore, modulated by means of a modulator (not shown) included in the sender 100.

The system described is totally reversible, that is, the sender 100 can also be fitted with means of receiving from the receiver 200. Similarly, the receiver 200 can be fitted with means of sending a signal like those of the sender 100.

Figure 1A:
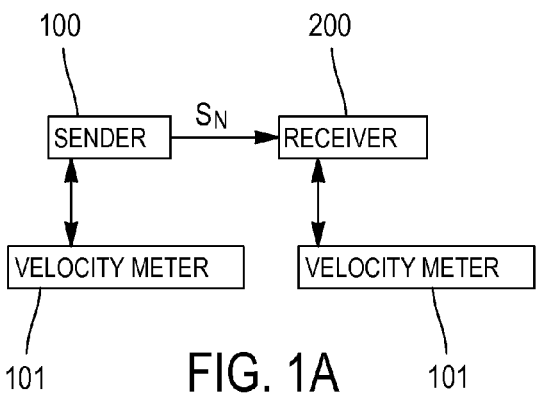
FIG. 1a is a diagram representing a transmission of a signal between two devices.
Figure 1B:
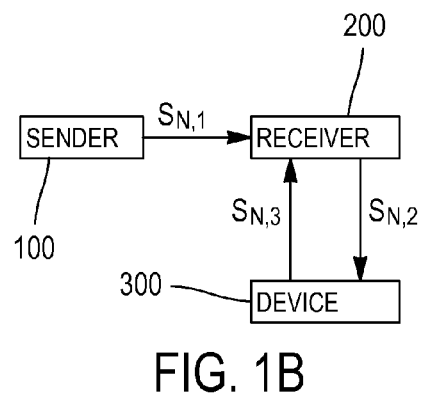
FIG. 1b is a diagram representing a transmission of signals between a sender and a receiver.

To this end, and as shown in FIG. 1b, it is totally feasible for a device 200, receiving a signal $S_{N,1}$ from a device 100, to send a signal $S_{N,2}$ to a device 300, then the receiver of the signal $S_{N,2}$. This device 300 can equally send a signal $S_{N,3}$ to another device not shown, or even to the device 100, or even to the device 200. The number of devices that can be interconnected is unlimited. In particular, a device 100 can send information to a number of receiving devices, at least one of these receiving devices being suitable for receiving the information sent by the device 100.

We will now limit ourselves to the case where signals are sent between two devices 100 and 200, respectively sender and receiver of the signal. The various means for sending a digital signal modulated by a spread-spectrum modulation are known and will not therefore be described in detail.

Figure 2:
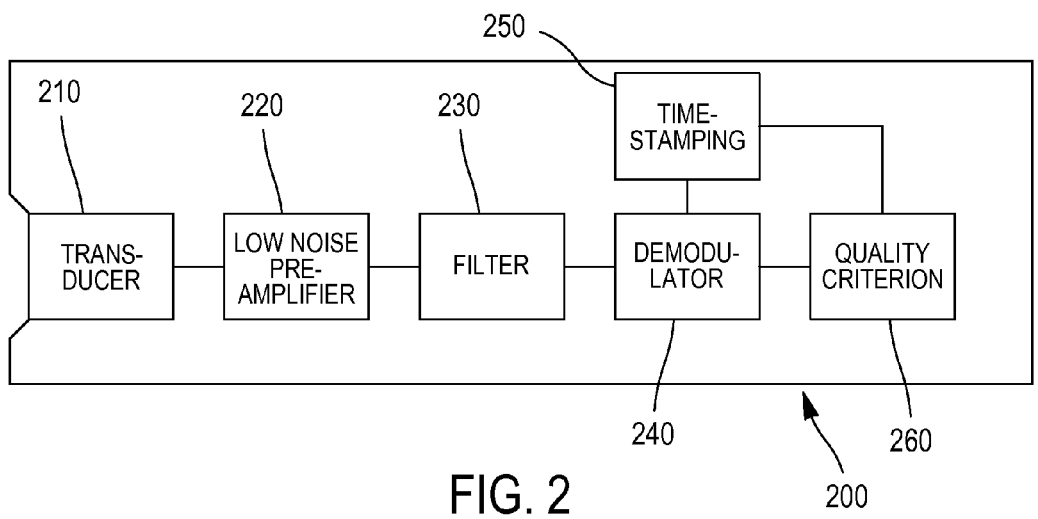
FIG. 2 is a diagram of a receiver according to the present invention.

FIG. 2 shows the main elements that make up the reception means of the receiver 200. The reception means include a transducer 210, for converting the acoustic signal $S_N$ into an electrical signal, a low-noise preamplifier 220, a conditioner-filter 230 providing automatic gain control and a demodulator 240. The preamplifier 220 and the conditioner-filter 230 are used to obtain a signal that is sufficiently strong and conditioned before the latter enters the demodulator 240.

The demodulator 240 does not simply demodulate the signal sent by the sender 100, but also, in conjunction with a suitable means 250, enables a time-stamping of the receipt of each bit of the signal. One advantage of the present invention is that the time-stamping is performed during demodulation, based on the bits of the signal $S_N$ transmitted between the sender 100 and the receiver 200. Thus, no specific signal is sent by the sender 100 solely to perform a measurement of propagation time between sender and receiver.

Figure 3A:
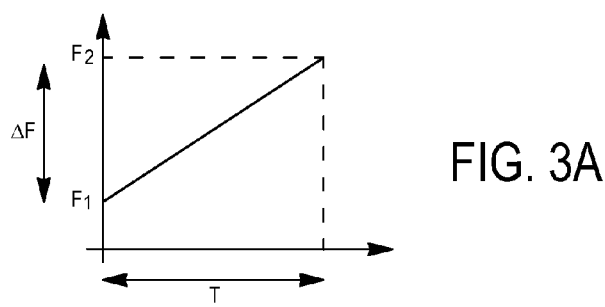
FIG. 3a represents a modulation time used in the context of the present invention to modulate an information bit.
Figure 3B:
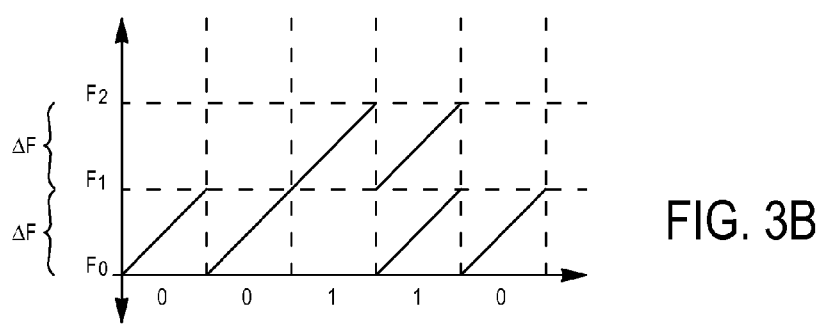

FIGS. 3a and 3b describe a type of modulation envisaged according to a preferred embodiment of the invention.

FIG. 3a shows the type of modulation employed for transmitting information between a sender and a receiver. This modulation is a spread-spectrum modulation otherwise known as linear-frequency modulation (or even CHIRP modulation). In this type of modulation, the carrier frequency of each bit of the signal $S_N$ sent changes over a frequency band $\Delta F$ between a value $F_1$ and a value $F_2$, linearly as a function of the time t, and this over a duration T for sending one bit.

FIG. 3b describes the transmission of a binary sequence. The sequence shown as an example is made up of the series of bits [0 0 1 1 0]. The "0" or "1" bits are both modulated over a frequency band of identical width $\Delta F$. However, these bits can be distinguished by the fact that the modulation is performed between a frequency $F_0$ and a frequency $F_1$ to modulate a "0" bit whereas it is performed between the frequency $F_1$ and a frequency $F_2$ to modulate the "1" bit.

Another type of spread-spectrum modulation is perfectly feasible, such as, for example, a maximum length binary sequence (MLBS) modulation. In this type of modulation, a "0" bit and a "1" bit are respectively represented by binary sequences coded differently and of equal lengths, each of these sequences being made up of a succession of acoustic pulses, these acoustic pulses forming bits.

As an example, a "0" bit can be represented by the binary sequence $SB_0 = [0\ 1\ 1\ 0\ 0\ 0]$ and a "1" bit by the binary sequence $SB_1 = [1\ 0\ 0\ 1\ 1\ 0]$, which is of the same length but coded differently. A binary sequence of "0" and "1" is therefore a binary sequence itself made up of binary sequences $SB_0$ and $SB_1$. The duration of a binary sequence $SB_0$ or $SB_1$ is of duration T, that is, of a duration in accordance with the time to send a "0" or "1" bit in linear-frequency modulation.

The maximum length binary sequence representing either a "0" bit or a "1" bit is carried by one and the same frequency and modulated, preferably, by a two-state phase modulation (MDP2). An advantage of the MLBS modulation is that it limits interference.

Figure 4A:
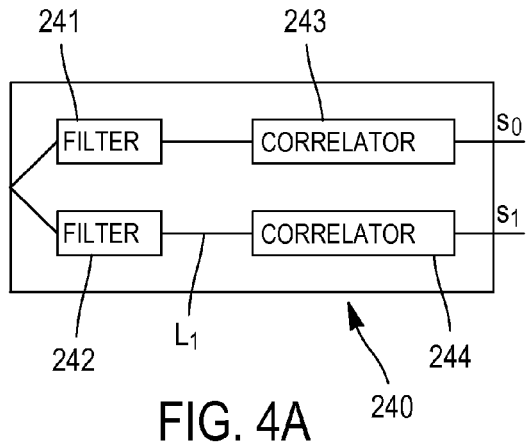
FIG. 4a represents a demodulator according to the present invention and used for a linear-frequency demodulation.
Figure 4B:
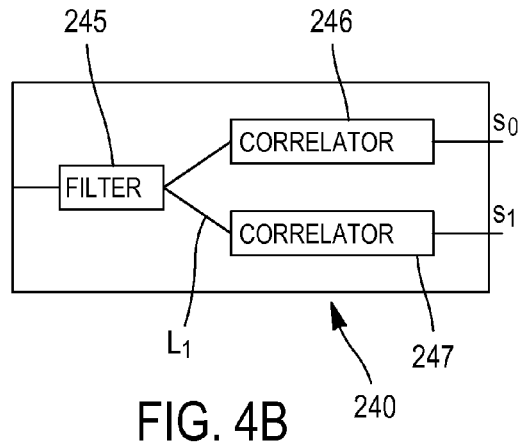
FIG. 4b represents a demodulator according to the present invention and used for a maximum length binary sequence demodulation.

FIGS. 4a and 4b show a diagram of the demodulator 240 implemented respectively in the case of a linear-frequency modulation and in the case of an MLBS modulation.

In FIG. 4a, the modulator 240 includes two lines $L_0$ and $L_1$, each including a filter 241 (or 242) and a correlator 243 (or 244). Each line $L_0$ or $L_1$ is associated with the exclusive processing either of "0" bits or of "1" bits, which gives the demodulator 240 two outputs $S_0$ and $S_1$. The filters 241 and 242 are used to filter the signals in the wanted band. It is understood that this filtering is not the same between the two filters, for there to be a selective detection either of a "0" bit or of a "1" bit in each of the filters, corresponding to the two types of acoustic pulses sent by the sender 100.

By notation, the line $L_0$ is associated with the processing of the "0" bits and the line $L_1$ with the processing of the "1" bits. In this case, a "1" bit arriving at the filter 241 of the line $L_0$ does not pass through this filter because the frequency band over which the "1" bit is modulated (between the frequencies $F_1$ and $F_2$) is not compatible with the cut-off frequency of this filter. This "1" bit cannot therefore provide a signal that can be used at the output of the filter 241 then at the output of the correlator 243 on this line $L_0$ relative to a "0" bit, the cut-off frequency of the filter 241 being compatible with the frequency band over which the "0" bit is modulated. The same applies for a "0" bit arriving at the filter 242 of the line $L_1$.

The correlators 243 and 244 are used to reconstruct the initial signal, from two reference signals, each of these signals being associated with a type of bit, that is, a type of pulses forming the acoustic signal.

In FIG. 4b, the demodulator 240 includes a single filter 245, the function of which is to allow the wanted frequency band to pass. In the MLBS modulation, the carrier frequency is, in fact, the same for both "0" and "1" bits, so a single filter is sufficient. The demodulator 240 also includes two lines $L_0$ and $L_1$, at the output of the filter 245, each including a correlator 246 (or 247). By notation, the line $L_0$ is associated with the processing of the "0" bits and the line $L_1$ with the processing of the "1" bits.

Each of the correlators 246 and 247 is compatible with the binary sequence representing a "0" bit and a "1" bit respectively. Because of this, on the line $L_0$, only the "0" bits can be correlated and provide a signal $S_0$ that can be used at the output of the demodulator 240. The same applies for the "1" bits on the line $L_1$.

The receiver 200 shown in FIG. 1a and FIG. 2 also includes a card (not shown) to manage all the reception means, this card itself including a means for generating an alarm strobing the operation of the modulator, a means for applying a quality criterion to the bits from the correlators (and therefore from the demodulator 240). This card can also provide a means for performing all the computations involved in estimating the propagation time and the distance separating the sender and the receiver.

Once the propagation time between the sender and the receiver is known, the distance separating them can be deduced knowing the velocity of the acoustic waves in the submarine environment concerned. For this, it is possible to envisage either providing at least one velocity meter 101 within the sender 100 and/or the receiver 200, or deducing the velocity from tables. In the case where a velocity meter is provided, the card handles the computations involved in obtaining the distance. In the case where tables are used, an operator recovers the data to perform these computations.

Figure 5:
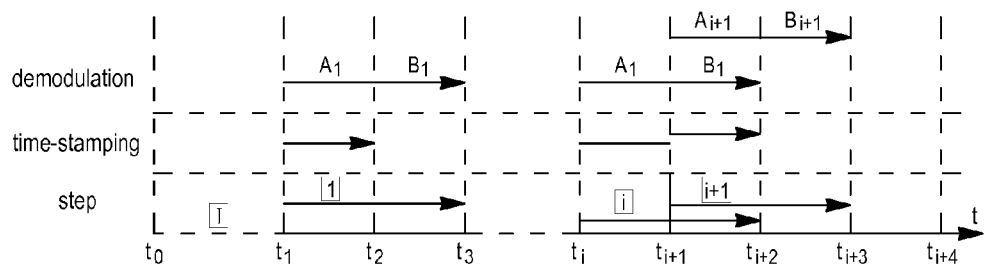
FIG. 5 is a functional diagram of the processing provided by the demodulator of FIGS. 4a and 4b.

FIG. 5 describes the method implemented by the various component means of the invention. This method has the same characteristics whether a linear-frequency modulation or a maximum length binary sequence modulation is used.

The detailed description that follows relates more particularly to a linear-frequency modulation. When a synchronization event occurs, a modulated binary sequence (as shown in FIG. 3b) is sent by the sender 100 at a time $t_0$. At this same time $t_0$, the receiver 200 of the signal switches to demodulation and time-stamping phase. The first bit of the binary sequence sent is detected on one of the filters 241, 242 of the receiver 200 at a time $t_1$. This initial step I therefore includes the time needed for propagation of the first bit of the sequence of the signal between the sender and the receiver.

The demodulation and the time-stamping of the first bit then begin at this time $t_1$. The time-stamping of this first bit continues until a time $t_2$, and this over a duration T ($t_2-t_1=T$) as defined in FIG. 3a. The detection of the first bit of the sequence at the time $t_1$ results, at this same time $t_1$, in the programming of an alarm to initiate the demodulation and the time-stamping of the next bit of the binary sequence. This programmed alarm is triggered at the time $t_2$, time at which the time-stamping of the first bit ends. The period of this alarm is therefore equal to the duration over which a bit of the sequence is sent, that is, equal to the duration T. Between the times $t_1$ and $t_2$, a part of the demodulation and the time-stamping of the first bit of the binary sequence is therefore performed.

Thus, each bit i with $1<i<N$ of the binary sequence involves steps consisting in:
  programming an alarm at the time $t_i$ that has to be triggered at the time $t_{i+1}$ with $t_{i+1}-t_i=T$,
  performing a time-stamping of the $i^{th}$ bit between the times $t_i$ and $t_{i+1}$,
  triggering, at the time $t_{i+1}$, of the alarm programmed at the time ti to initiate the time-stamping of the $(i+1)^{th}$ bit of the binary sequence.

The demodulation performed in a step i with $i>1$ is broken down into two separate phases. The first, phase $A_i$, is where the bit, once detected, is filtered by one of the filters 241 or 242. The time-stamping of the bit concerned is performed at the same time as this phase $A_i$. The second, phase $B_i$, is where the $i^{th}$ bit time-stamped during phase $A_i$ and obtained from one of the filters 241 or 242 is correlated in one of the correlators 243 or 244 with a reference signal to reconstruct the signal sent. This correlation phase $B_i$ is performed at a time offset from the phase $A_i$, that is, it begins after this phase $A_i$. Preferably, the duration of the phase $B_i$ is equal to a bit time T such that a bit outgoing from one of the filters 241 or 242 can immediately be processed by one of the associated correlators 243 or 244.

In the case of a maximum length binary sequence (MLBS) modulation, the method employed is identical to that described above, but with the following differences: a single filter 245 is employed because the "0" and "1" bits are on one and the same carrier, and the period T corresponds to the length of the coded binary sequence representing either a "0" bit or a "1" bit.

Whatever modulation technique is employed, the time-stamping of each bit of the binary sequence is performed independently, with reference to the clock. Furthermore, this time-stamping can be done based on the fact that the sending and receiving devices are synchronized with the clock. To maintain this synchronism, it is possible to use a satellite positioning system with which the clock has an accurate reference or even a high-stability clock.

Once all the bits of the binary sequence have been demodulated and time-stamped, the propagation time between the sender 100 and the receiver 200 is computed by taking into account only those bits satisfying a quality criterion. This quality criterion is determined at the output of the demodulator 240 by a means 260 diagrammatically represented in FIG. 2. This means synthesizes the data supplied by the means 250 giving the time-stamping of each bit and applies the quality criterion. Typically, the quality criterion corresponds to a threshold value to be exceeded by the correlation peak obtained at the outputs of the correlators of the demodulator 240. In this case, only those bits providing for a correlation peak exceeding this threshold value are taken into account by the means 260.

The time-stamping of each bit and the knowledge of the position of each bit in the binary sequence are used to obtain an estimation of the time at which the binary sequence was sent on the sender 100 for each bit time-stamped on the receiver 200. An average of the various estimations provided for each bit in turn is then computed. Given that only those bits that satisfy the quality criterion are taken into account in computing the average, the estimation of the propagation time between the sender and the receiver is robust versus disturbances on the acoustic channel such as, for example, noise or even fading.

The act of averaging provides for the most representative estimation possible. It will also be understood that the more bits satisfying the quality criterion there are in the binary sequence, the more the computation of the average will provide an accurate estimation of the propagation time of the signal.

Furthermore, as the number of bits in the binary sequence increases, the time-stamping jitter decreases. Time-stamping jitter is understood to mean an undesirable variation in the estimation of the propagation time of a bit compared to another bit of the binary sequence, itself representative of the average propagation time. More precisely, the act of averaging the propagation times estimated over a number N of bits satisfying the quality criterion, makes it possible to divide the standard deviation of the jitter by a factor $\sqrt{N}$.

However, in some cases, the number of bits contained in a binary sequence must be limited. Such is the case, for example, when the relative speed between the sender and the receiver becomes non-negligible. In practise, in this case, the product of signal propagation time by relative velocity between the sender and the receiver, corresponding to a change in the distance between them, becomes non-negligible relative to the actual distance between sender and receiver at the moment the binary sequence is sent. It is therefore very useful to have short binary sequences to obtain the fairest possible estimation of the distance separating sender and receiver at the moment the signal is sent.

Figure 6:
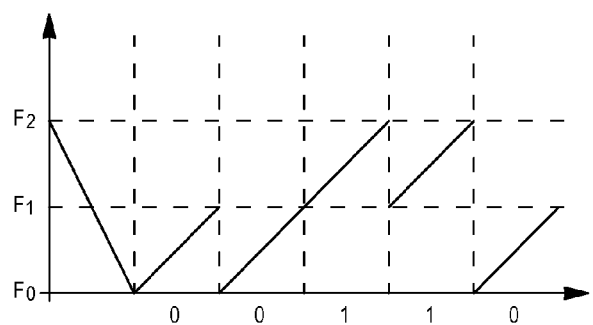

In this case, and because of the limited number of bits contained in the binary sequence, the time-stamping jitter can prove non-negligible. In the case of a linear-frequency modulation and to reduce this time-stamping jitter, it is then possible to envisage using all of the available frequency band between $F_0$ and $F_2$, that is $2\Delta F$, to modulate the first bit of the binary sequence, as shown in FIG. 6. In practise, this increases the band-duration product and enhances the processing gain, which means enhanced reception, a lower sensitivity associated with the multiple paths. In this case, the choice of a linear-frequency modulation is particularly relevant because this technique itself provides a significant processing gain.

This possibility is, however, not limited to the case where the binary sequence is short and/or the sender and the receiver are in motion relative to each other, but can also be envisaged in the case where the binary sequence is long and/or the sender and the receiver are not in motion relative to each other.

The invention claimed is:

1. A system of digital communication between submarine devices, including at least one submarine sender (100), at least one submarine receiver (200), and a common clock,
   wherein the at least one sender (100) and the at least one submarine receiver (200) are synchronized with the common clock,
   wherein the at least one submarine sender (100) has means of sending an acoustic signal having a binary sequence of bits in a modulated form,
   the at least one submarine receiver comprising:
   a demodulator (240) for detecting and demodulating each bit of the signal arriving at the at least one submarine receiver (200) is provided in the at least one submarine receiver (200),
   a time-stamping means (250), by which a time-stamping of each bit of the signal detected on the demodulator (240) is performed independently with reference to the clock, is provided in the at least one submarine receiver (200),
   estimating means for estimating the propagation time of the signal from said at least one submarine sender (100) to said at least one submarine receiver (200) based on said time-stampings is provided in the at least one submarine receiver (200), and
   a means for applying a quality criterion to the bits from the demodulator (240), wherein said propagation time is computed by said means for estimating the propagation time taking into account only those bits satisfying the quality criterion.

2. The system according to claim 1, characterized in that means for obtaining, based on the time-stamping of each bit and the knowledge of the position of each bit in the binary sequence, an estimation of the time at which the binary sequence was sent on the sender (100) for each bit time-stamped on the at least one submarine receiver (200), is provided in the at least one submarine receiver (200).

3. The system according to claim 1, wherein said means for estimating the propagation time computes an average value of the time-stampings of the bits satisfying the quality criterion for estimating the propagation time.

4. The system according to claim 1, characterized in that the sender (100) of the signal includes a transducer for generating acoustic pulses, each of these pulses forming a bit of the binary sequence, and a modulator for modulating each bit of the binary sequence by a linear-frequency spread spectrum modulation.

5. The system according to claim 1, characterized in that the sender (100) of the signal includes a transducer for generating acoustic pulses, each of these pulses forming a bit of the binary sequence, and a modulator for modulating each bit of the binary sequence by a maximum length binary sequence (MLBS) modulation.

6. The system according to claim 1, characterized in that
   the at least one submarine sender (100) and the at least one submarine receiver (200) are in a submarine environment,
   the signal includes acoustic waves in the submarine environment, and
   the at least one submarine receiver (200) includes a velocity meter for measuring a velocity of the acoustic waves in the submarine environment and means to deduce from the propagation time and the velocity the distance separating the at least one submarine sender (100) and the at least one submarine receiver (200).

7. A system of digital communication between submarine devices, the system comprising at least one submarine sender (100), at least one submarine receiver (200) and a common clock,
   wherein the at least one sender (100) and the at least one submarine receiver (200) are synchronized with the common clock,
   wherein the at least one submarine sender (100) has means of sending an acoustic signal having a binary sequence of bits in a modulated form,
   the at least one submarine receiver comprising:
   a demodulator (240) for detecting and demodulating each bit of the signal arriving at the at least one submarine receiver (200) is provided in the at least one submarine receiver (200),
   a time-stamping means (250), by which a time-stamping of each bit of the signal detected on the demodulator (240) is performed independently with reference to the clock, is provided in the at least one submarine receiver (200),
   estimating means for estimating the propagation time of the signal from said at least one submarine sender (100) to said at least one submarine receiver (200) based on said time-stampings provided in the at least one submarine receiver (200),
   means for programming at a time $t_i$ an alarm that must be triggered at a time $t_{i+1}$ with $t_{i+1}-t_i=T$ is provided in the at least one submarine receiver (200), wherein $t_1$ is a time at which the demodulator detects a first bit of the binary sequence,
   means for time-stamping the $i^{th}$ bit between the times $t_i$ and $t_{i+1}$ for each bit with $1<i<N$ of the binary sequence is provided in the at least one submarine receiver (200), and
   means for triggering at the time $t_{i+1}$ the alarm programmed at the time $t_i$ to initiate the time-stamping of the $(i+1)^{th}$ bit of the binary sequence and for time-stamping the last bit between the times $t_N$ and $t_{N+1}$ are provided in the at least one submarine receiver (200).

8. A system of digital communication between submarine devices, including at least one submarine sender (100), at least one submarine receiver (200) and a common clock,
- wherein the at least one sender (100) and the at least one submarine receiver (200) are synchronized with the common clock,
- wherein the at least one submarine sender (100) has means of sending an acoustic signal having a binary sequence of bits in a modulated form,
- the at least one submarine receiver comprising:
- a demodulator (240) for detecting and demodulating each bit of the signal arriving at the at least one submarine receiver (200) is provided in the at least one submarine receiver (200),
- a time-stamping means (250), by which a time-stamping of each bit of the signal detected on the demodulator (240) is performed independently with reference to the clock, is provided in the at least one submarine receiver (200),
- an estimating means for estimating the propagation time of the signal from said at least one submarine sender (100) to said at least one submarine receiver (200) based on said time-stampings is provided in the at least one submarine receiver (200),
- and wherein said bits comprise 0 bits and 1 bits, the demodulator (240) includes two lines ($L_0$, $L_1$), respectively demodulating the 0 bits and the 1 bits, and respectively including a filter (241, 242) for filtering the $i^{th}$ bit between the times $t_i$ and $t_{i+1}$ and a correlator (243, 244) for correlating the $i^{th}$ bit from the filter (241, 242, 245) between times $t_{i+1}$ and $t_{i+2}$ with $t_{i+2}-t_{i+1}=T$ for each bit i with $1<i<N$ of the binary sequence.

9. A system of digital communication between submarine devices, including at least one submarine sender (100), at least one submarine receiver (200) and a common clock,
- wherein the at least one sender (100) and the at least one submarine receiver (200) are synchronized with the common clock,
- wherein the at least one submarine sender (100) has means of sending an acoustic signal having a binary sequence of bits in a modulated form,
- the at least one submarine receiver comprising:
- a demodulator (240) for detecting and demodulating each bit of the signal arriving at the at least one submarine receiver (200) is provided in the at least one submarine receiver (200),
- a time-stamping means (250), by which a time-stamping of each bit of the signal detected on the demodulator (240) is performed independently with reference to the clock, is provided in the at least one submarine receiver (200),
- an estimating means for estimating the propagation time of the signal from said at least one submarine sender (100) to said at least one submarine receiver (200) based on said time-stampings is provided in the at least one submarine receiver (200),
- and further wherein said bits comprise 0 bits and 1 bits, the demodulator (240) includes a filter (245) for filtering the $i^{th}$ bit between the times $t_i$ and $t_{i+1}$ and having an output, two lines ($L_0$) and ($L_1$) respectively demodulating the 0 bits and the 1 bits, located at the output of the filter (245) and respectively including a correlator (246, 247) for correlating the $i^{th}$ bit from the filter (241, 242, 245) between times $t_{i+1}$ and $t_{i+2}$ with $t_{i+2}-t_{i+1}=T$ for each bit i with $1 \leq i \leq N$ of the binary sequence.

10. A method of digital communication between submarine devices, including at least one submarine sender (100), a common clock, and at least one submarine receiver (200), the receiver comprising a demodulator, a time-stamping means, and a propagation time estimation means, comprising the steps of:
- synchronizing the at least one sender (100) and the at least one submarine receiver (200) with the common clock,
- sending from the at least one submarine sender (100) an acoustic signal having a binary sequence of bits in a modulated form,
- detecting and demodulating in the demodulator (240) each bit of the signal arriving at the at least one submarine receiver (200),
- time-stamping in the time-stamping means (250) each bit of the signal detected on the demodulator (240) independently with reference to the clock during receipt,
- estimating in the estimation means a propagation time of the signal from said at least one submarine sender (100) to said at least one submarine receiver (200) based on said time-stampings,
- in the at least one submarine receiver (200) applying a quality criterion to the bits from the demodulator (240), and
- in the at least one submarine receiver (200) estimating said propagation time by taking into account only those bits satisfying the quality criterion.

11. The method according to claim 10, including a step comprising:
- obtaining an estimation of the time at which the binary sequence was sent on the sender (100) for each bit time-stamped on the at least one submarine receiver (200) based on the time-stamping of each bit and the knowledge of the position of each bit in the binary sequence.

12. The method according to claim 10, including the step of:
- in the at least one submarine receiver (200) computing an average value of the time-stampings of the bits satisfying the quality criterion for estimating the propagation time.

13. The method according to claim 10, in which the modulation is a modulation step comprising:
- modulating the binary sequence by a maximum length binary sequence (MLBS) modulation, in which a maximum length binary sequence ($SB_0$, $SB_1$), of duration T, respectively codes a 0 bit or a 1 bit.

14. The method according to claim 10, in which the time-stamping is done based on the fact that the sender and the receiver are synchronized with the clock, using a satellite positioning system with which the clock has an accurate reference.

15. A method of digital communication between submarine devices, including at least one submarine sender (100), a common clock, and at least one submarine receiver (200), the receiver comprising a demodulator, a time-stamping means, and a propagation time estimating means, the method comprising the steps of:
- synchronizing the at least one sender (100) and the at least one submarine receiver (200) with the common clock,
- sending an acoustic signal from the at least one submarine sender (100), the signal having a binary sequence of N bits in a modulated form,
- detecting and demodulating in the demodulator each bit of the signal arriving at the at least one submarine receiver (200),
- time-stamping in the time-stamping means each bit of the signal detected on the demodulator (240) independently with reference to the clock during receipt, estimating the propagation time of the signal from said at least one submarine sender (100) to said at least one submarine receiver (200) based on said time-stampings, sending from the at least one submarine sender (100) the acoustic signal having the binary sequence of N bits in the modulated form, detecting a first bit of the binary sequence by the receiver (200) at a time $t_1$, then, for each bit with $1<i<N$ of the binary sequence:

programming an alarm at a time $t_i$ that must be triggered at a time $t_{i+1}$ with $t_{i+1}-t_i=T$, time-stamping the $i^{th}$ bit between the times $t_i$ and $t_{i+1}$, at the time $t_{i+1}$, triggering the alarm programmed at the time $t_i$ to initiate the time-stamping of the $(i+1)^{th}$ bit of the binary sequence, then:

time-stamping the last bit between the times $t_N$ and $t_{N+1}$.

16. The method according to claim 15, including a demodulating step comprising, for each bit i with $1 \leq i \leq N$ of the binary sequence: filtering the $i^{th}$ bit in a filter (241, 242, 245) of the demodulator (240) between the times $t_i$ and $t_{i+1}$ with $t_{i+1}-t_i=T$, correlating the $i^{th}$ bit, from the filter (241, 242, 245) in one of correlators (243, 244, 246, 247) between the times $t_{i+1}$ and $t_{i+2}$ with $t_{i+2}-t_{i+1}=T$.

17. A method of digital communication between submarine devices, including at least one submarine sender (100), a common clock, and at least one submarine receiver (200), the receiver comprising a demodulator, a time-stamping means, and a propagation time estimating means, the method comprising the steps of:

synchronizing the at least one sender (100) and the at least one submarine receiver (200) with the common clock, sending an acoustic signal from the at least one submarine sender (100), the signal having a binary sequence of N bits in a modulated form, detecting and demodulating in the demodulator each bit of the signal arriving at the at least one submarine receiver (200), time-stamping in the time-stamping means each bit of the signal detected on the demodulator (240) independently with reference to the clock during receipt, estimating the propagation time of the signal from said at least one submarine sender (100) to said at least one submarine receiver (200) based on said time-stampings, further comprising a linear-frequency spread spectrum modulation step comprising:

modulating each type of bit over an identical duration T and over a different range of frequencies, the one being between frequencies $F_0$ and $F_1$ and the other being between frequencies $F_1$ and $F_2$, said ranges extending over an identical frequency band $\Delta F$.

18. A method of digital communication between submarine devices, including at least one submarine sender (100), a common clock, and at least one submarine receiver (200), the receiver comprising a demodulator, a time-stamping means, and a propagation time estimating means, the method comprising the steps of:

synchronizing the at least one sender (100) and the at least one submarine receiver (200) with the common clock, sending an acoustic signal from the at least one submarine sender (100), the signal having a binary sequence of N bits in a modulated form, detecting and demodulating in the demodulator each bit of the signal arriving at the at least one submarine receiver (200), time-stamping in the time-stamping means each bit of the signal detected on the demodulator (240) independently with reference to the clock during receipt, estimating the propagation time of the signal from said at least one submarine sender (100) to said at least one submarine receiver (200) based on said time-stampings, the method further comprising a linear-frequency spread spectrum modulation step comprising:

modulating the first bit of the binary sequence over a duration T and over the entire range of available frequencies $2\Delta F$, modulating all the other bits so that each type of bit is modulated over a duration T and over a different range of frequencies, the one being comprised between frequencies $F_0$ and $F_1$ and the other being comprised between frequencies $F_1$ and $F_2$, said ranges extending over an identical frequency band $\Delta F$.

* * * * *